ELECTRONIC CHASSIS MOUNTING ASSEMBLY

Filed Jan. 12, 1962 2 Sheets-Sheet 1

INVENTOR.
George M. Rapata
BY: Olson, Trexler, Wolters & Bushnell attys.

April 2, 1963 G. M. RAPATA 3,084,211

ELECTRONIC CHASSIS MOUNTING ASSEMBLY

Filed Jan. 12, 1962

2 Sheets-Sheet 2

INVENTOR.
George M Rapata
BY
Olson, Trexler
Wolters & Bushnell
attys 3,084,211

ELECTRONIC CHASSIS MOUNTING ASSEMBLY

George M. Rapata, Park Ridge, Ill., assignor to Illinois Tool Works Inc., Chicago, Ill., a corporation of Delaware Filed Jan. 12, 1962, Ser. No. 165,888
18 Claims. (Cl. 174—158)

The present invention relates to a novel assembly including an apertured workpiece to be supported and a novel fastening device applied thereto and adapted to receive a screw member or the like. This application is a continuation-in-part of my copending application Serial No. 67,050, filed November 3, 1960, which was in turn copending with and a division of my application Serial No. 625,008, filed November 26, 1956, now Patent No. 2,974,703.

While features of the present invention may be incorporated into various assemblies, it is contemplated that the present invention is especially suitable for securing or mounting workpieces such as an electronic chassis to a support member. In this and other assemblies it is frequently necessary or desirable to provide means whereby a threaded member or screw may be connected to or mounted on a workpiece such as an electronic chassis in a manner such that the threaded member or screw is disposed generally parallel to the workpiece.

An important object of the present invention is to provide a novel assembly including a workpiece such as an electronic chassis or the like of simplified construction and a novel plastic fastening device or anchoring member which may be readily applied to the workpiece and which is adapted to accommodate a complementary fastener such as a screw or the like for securing the assembly including the workpiece to a support element or frame member in a simple, economical and secure manner.

Another important object of the present invention is to provide a novel fastener element or anchor member for use in an assembly of the above described type and adapted electrically to insulate the workpiece or chassis from the complementary fastener element or screw and the support member to which the anchor member and workpiece are secured.

A further object of the present invention is to provide a novel one-piece plastic fastening element or anchor member adapted to be assembled or snapped around a plurality of edges formed on the workpiece for securing the anchor member to the workpiece and also adapted to receive a threaded member or other element disposed generally parallel to the workpiece.

A more specific object of the present invention is to provide a novel fastening device or anchor member of the above described type which is adapted to be inserted through an aperture in a workpiece and also to be assembled around an adjacent margin or edge of the workpiece for obtaining a secure connection with the workpiece and for spacing the edge from an adjacent support member or other part of an installation.

Other objects and advantages of the present invention will become apparent from the following description and the accompanying drawings wherein.

Figures 1, 2, 3, 4, 5, 6:
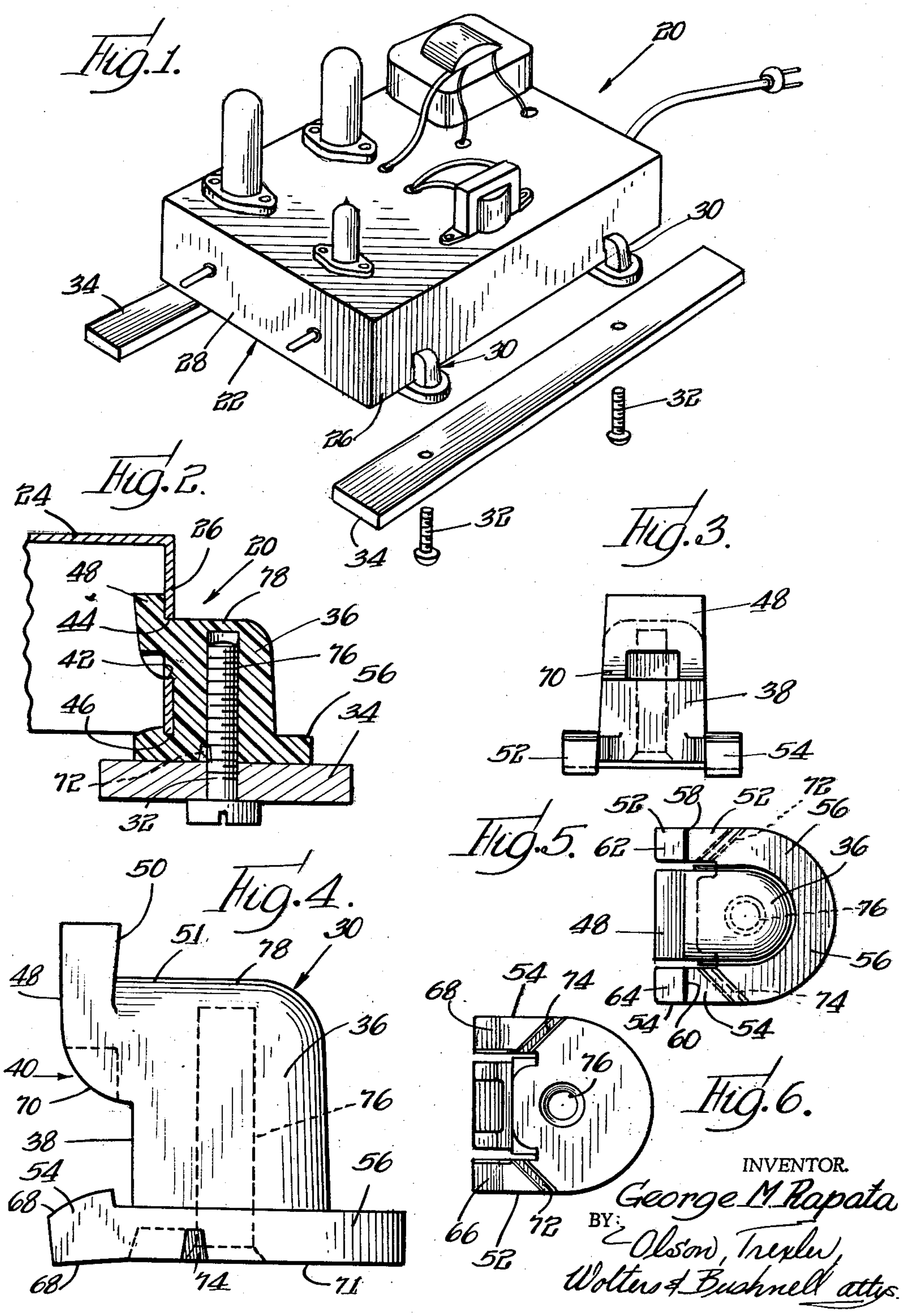
FIG. 1 is a partially exploded view showing an assembly incorporating features of the present invention.
FIG. 2 is a partial sectional view of an assembly incorporating features of the present invention.
FIG. 3 is an entering end view of a fastening device or anchoring member incorporating features of the present invention.
FIG. 4 is an enlarged side elevational view of the fastening device or anchor member.
FIG. 5 is a top view of the anchoring member or fastening device.
FIG. 6 is a bottom view of the anchor member.

Referring now more specifically to the drawings wherein like parts are designated by the same numerals throughout the various figures, an assembly 20 incorporating features of the present invention, is shown in FIGS. 1 and 2. The assembly 20 includes a workpiece 22 which, in the embodiment shown, is the sheet metal base of an electronic chassis. The workpiece 22 is of very simple construction and comprises a top panel 24, generally vertically disposed depending side panels 26 and depending end panels 28.

In accordance with a feature of the present invention the assembly 20 further includes novel anchor members 30 constructed and secured to the depending side panels of the workpiece in the manner described in detail below. The anchor members 30 are adapted to accommodate screw elements 32 or other complementary fasteners for securing the assembly to support or frame members 34. The fastening devices or anchor member 30 are preferably molded in one piece from a tough resilient plastic material having electrical insulating characteristics for insulating the workpiece or chassis base from the frame or support members 34 and the complementary fasteners or screws 22 when the assembly is completed as shown in FIG. 2.

As shown best in FIGS. 2–6, each fastening device or anchor member 30 comprises a body section 36 adapted to overlie one side of a workpiece and having a flat surface 38 adapted to abut one surface of the workpiece. The anchor member also includes an attachment section 40 adapted to be engaged around edges presented by the workpiece 22 for securing the anchor member with respect to the workpiece.

In this embodiment the workpiece is provided with an aperture 42 which presents an edge 44 facing in the same direction as and spaced a predetermined distance above the lower margin or edge 46 of the side panel 26. The attachment section 40 of the anchor member includes a first portion 48 extending from adjacent one end of the body section 36 and adapted to be inserted through the aperture 42 and to engage behind the edge 44. The portion 48 presents a shoulder surface 50 which extends upwardly beyond an upper end surface 51 of the anchor member for engaging the inner surface of the apertured workpiece panel 26 above the edge 44. The attachment section also includes finger-like portions 52 and 54 which extend from an enlarged base or foot portion 56 of the body section 36. The finger-like portions 52 and 54 respectively present shoulders 58 and 60 providing hook-like means adapted to be snapped around the edge 46 on the workpiece or side panel 26.

As shown best in FIG. 4, the shoulder surface 50 of the attachment portion 48 is initially formed so that it extends diagonally outwardly with respect to the horizonal axis of the anchor member or the axis of the aperture 42 in the workpiece and also diagonally with respect to the plane of the abutment surface 38. With this arrangement, the shoulder surface 50 is adapted firmly to engage the back of the apertured workpiece regardless of minor variations in the thickness of the workpiece. Furthermore, when the anchor member is fully applied to the workpiece as shown in FIG. 2, the attachment portion 48 will be flexed until the surface 50 is substantially parallel to the surface 38 and the inner surface of the workpiece, and the inherent resiliency of the plastic material provides a spring action which firmly draws the body section 36 against the outer surface of the apertured workpiece.

In order to facilitate snapping of the hook-like end portions of the finger elements 52 and 54 around the lower edge of the apertured workpiece, these elements are respectively provided with upwardly facing cam surfaces 62 and 64 which are respectively inclined downwardly from the shoulders 58 and 60. In addition, the shoulder surfaces 58 and 60 are formed so that they flare outwardly away from the surface 38. This angular arrangement of the shoulder surfaces also enables the device to accommodate workpieces or panels of varying thicknesses, since the lower ends of the shoulder surfaces 58 and 60 are spaced from the abutment surface 38 a distance approximately equal to the thinnest workpiece or panel to be encountered while the upper or free ends of the shoulder surfaces 58 and 60 are spaced from the abutment surface 38 a distance slightly greater than the thickest workpiece or panel to be encountered.

Lower surfaces 66 and 68 of the finger elements are inclined downwardly from the plane of a generally flat bottom end surface 71 of the base or foot portion 56 as shown in FIG. 4. When the anchor member is secured to a support by means of a screw or the like as shown in FIG. 2, the downwardly inclined or cam surfaces 66 and 68 cause the finger-like elements to flex upwardly so that the shoulder surfaces 58 and 60 are positively urged and clamped against the backside of the apertured workpiece or panel.

As shown in FIGS. 2 and 4, the attachment portion 48 is provided with a rounded surface 70 extending from the abutment surface 38. The configuration of this surface facilitates insertion of the portion 48 through the aperture 42. In addition, the surface 70, adjacent its junction with the surface 38, is spaced from the upper surfaces of the finger-like elements 52 and 54, also adjacent the abutment surface 38, a distance approximately equal to the distance between the edge 46 of the workpiece and the lower edge of the aperture 42. When the finger-like elements are deflected upwardly as a result of the engagement of the inclined or cammed surfaces 66 and 68 with the support member, the workpiece or panel will be clamped between the surface 70 and the opposing surfaces of the finger-like elements.

When assembling the anchor member with the apertured workpiece or panel 26, the anchor member is first tilted relative to the panel and the portion 48 is inserted through the aperture 42. Then the anchor member is pivoted toward the workpiece so that the cam surfaces 62 and 64 of finger elements engage the lower edge 46 of the workpiece. Upon further movement of the anchor member toward the workpiece or panel, the finger elements are deflected downwardly for permitting the shoulders 58 and 60 to pass beneath the lower edge of the workpiece. In order to facilitate such flexing of the finger elements, grooves 72 and 74 are formed in the lower surfaces of the finger elements 52 and 54 respectively. As shown best in FIGS. 5 and 6, these grooves are diagonally arranged and partially traverse the junctions between the finger elements 52 and 54 and the remainder of the base or foot portion 56 so as to minimize any possibility of the finger elements cracking at these junctions. The grooves provide the finger elements with increased flexibility so that they may be readily snapped beneath the lower edge of the workpiece or apertured panel. At the same time, the finger elements have sufficient bulk or thickness so that they are capable of supporting the weight of the chassis and of properly spacing the workpiece from the surrounding support structure and so that the shoulders 58 and 60 are provided with adequate strength and rigidity.

As previously indicated the anchor member 30 is adapted to accommodate a complementary fastener or screw element 32. More specifically, the body section 36 is provided with an elongated bore 76 extending upwardly through the base or foot portion 56 for accommodating the screw. Preferably the bore 76 is formed with a smooth wall and a diameter less than the maximum diameter of the threads of the screw 32. Thus when the screw is applied to the bore 76, it will form complementary thread convolutions in the wall of the bore.

It is to be noted that the bore 76 is closed by an end wall 78 at its upper end so as to insure insulation of the screw from the workpiece. Furthermore, the bore 76 is disposed so that its axis is vertically arranged or substantially parallel to the abutment surface 38 and the apertured workpiece or panel 26. With this arrangement any possibility of the screw member interfering with the workpiece is precluded and, in the embodiment shown, the weight of the chassis is transferred directly through the anchor member to the support member 34 so that no strain is applied to the screw element 32.

Figures 7, 8, 9, 10, 11, 12, 13:
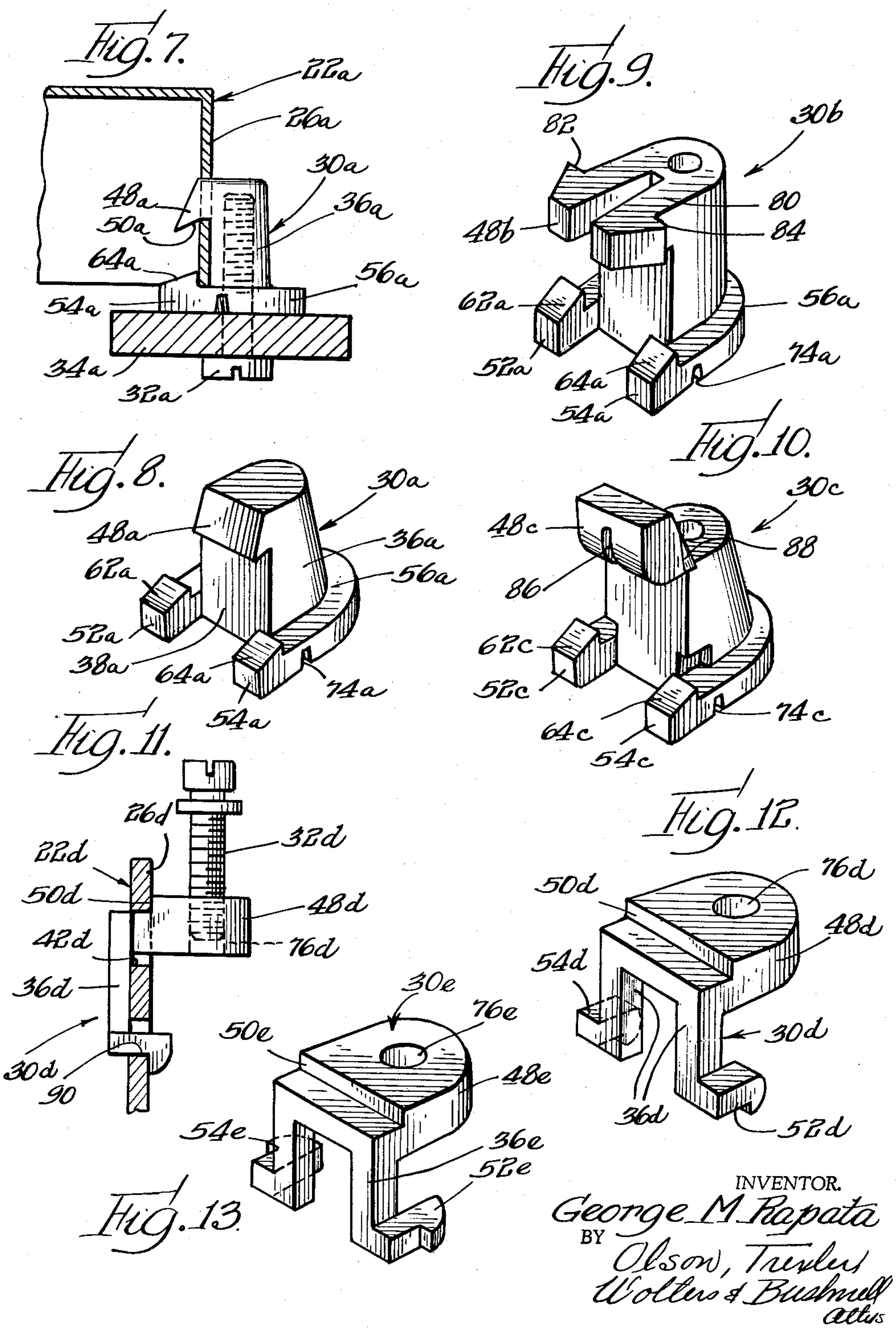
FIG. 7 is a partial sectional view showing an assembly incorporating a modified form of the present invention.
FIG. 8 is a perspective view showing the fastening device or anchor member of FIG. 7.
FIG. 9 is a perspective view showing another embodiment of the present invention.
FIG. 10 is a perspective view showing a further modified form of the present invention.
FIG. 11 is a partial sectional view showing an assembly incorporating still another embodiment of the present invention.
FIG. 12 is a perspective view showing the fastening device or anchor member of FIG. 11.
FIG. 13 is a perspective view showing a further slightly modified form of the present invention.

FIGS. 7 and 8 show a modified form of the present invention which is similar to the structure described above as indicated by the application of identical reference numerals with the suffix *a* added to corresponding parts. This embodiment differs primarily in that the attachment section portion **48*a* is in the form of a hook which extends downwardly or generally toward the finger elements 52*a* and 54*a* rather than upwardly. This anchor device is also assembled with the workpiece by first inserting the portion 48*a*** through the workpiece aperture and then snapping the finger elements around the lower margin of the workpiece.

FIG. 9 shows an anchor member incorporating another form of the present invention as indicated by the application of identical reference numerals with the suffix *b* added to elements corresponding to those in the structures described above. In this embodiment the attachment section **48*b* is in the form of a pair of resilient prongs 78 and 80 having oppositely and laterally extending hook elements or shoulders 82 and 84. With this construction, the prongs 78 and 80 are adapted to be snapped through the aperture in the workpiece at the same time that the finger elements 52*b* and 54*b*** are snapped beneath the lower margin of the workpiece.

FIG. 10 shows an anchor member **30*c* incorporating another slightly modified form of the present invention. This anchor member differs from the anchor member 30 in that the attachment portion 48*c* is provided with a slot 86 therethrough for increasing its flexibility. The slot 86 may terminate short of the free end of the portion 48*c* as shown in FIG. 10. In addition, the portion 48*c* is provided with laterally projecting barbs 88** at opposite sides thereof, only one of which is shown. These barbs are adapted to be snapped through the workpiece aperture for aiding in retaining the anchor member in a preliminary state of assembly with the workpiece prior to the time when the finger elements are snapped beneath the lower edge of the workpiece.

FIGS. 11 and 12 show still another embodiment of the present invention similar to the structures described above as indicated by the application of identical reference numerals with the suffix *d* added to corresponding elements. In this embodiment the attachment portion **48*d* is enlarged and is provided with a transversely extending bore 76*d* for accommodating a screw element 32*d*. The screw element 32*d* may serve to secure the assembly to a support structure in a manner similar to the previously described embodiments, or it may serve as means for adjusting any desired element or part, not shown, relative to the anchor member and the workpiece or apertured panel. It will be observed that this embodiment is particularly adapted for application to a workpiece having a pair of apertures therein. As shown in FIG. 11 the workpiece 26***d* is provided with an aperture 90 offset from the aperture 42*d*. The finger elements 52*d* and 54*d* of the attachment section extend from the body section for insertion through the aperture 90. When assembling the device 30*d* with the apertured workpiece, the attachment portion 48*d* is first inserted through the aperture 42*d* whereupon the finger elements 52*d* and 54*d* are snapped through the aperture 90. It will be observed that the resilient finger elements 52*d* and 54*d* engage an edge of the aperture 90 facing oppositely from an edge of the aperture 42*d* engaged by the portion 48*d*. Preferably, the finger elements are formed so that they will be slightly flexed when the device is fully applied to the workpiece whereby the device is resiliently but firmly engaged against the aforementioned oppositely facing edges of the apertures.

FIG. 13 shows an anchor member essentially identical to the anchor member 30*d* as indicated by the application of identical reference numerals with the suffix *e* added to corresponding elements. This embodiment differs in that the finger portions 52*d* and 54*d* are disposed so that their respective shoulders extend laterally outwardly rather than downwardly.

While the preferred embodiments of the present invention have been shown and described herein, it is obvious that many structural details may be changed without departing from the spirit and scope of the appended claims.

The invention is claimed as follows:

1. An assembly comprising an electronic chassis including a generally horizontal section and a substantially vertical panel extending downwardly from said section and having a free bottom terminal edge, said panel having an aperture therethrough partially defined by a second edge spaced a predetermined distance above said bottom edge, and a one-piece resilient electrically non-conductive plastic anchor member including a body section having a side surface disposed against one side of said panel and having a lower end portion adapted to rest on a support member, said body section including elongated bore means extending upwardly through said lower end portion and generally parallel to said panel for receiving and threadedly engaging a complementary fastener such as a screw which may be used to secure the anchor member to the support member, said anchor member including an attachment section comprising a first portion extending laterally from said body section through said aperture and engaging behind said panel, and a resilient second section extending from said lower end portion of the body section and beneath the bottom edge, said second section including upwardly projecting shoulder means engaging behind said panel, said anchor member electrically insulating said panel from said support member and the screw.

2. An assembly, as defined in claim 1, wherein said first and second mentioned edges face in opposite directions, and said first and second portions of the attachment section include surfaces firmly engaging said edges for preventing relative vertical movement between the anchor member and said panel.

3. An assembly, as defined in claim 1, wherein said first attachment section portion extends upwardly behind said panel.

4. An assembly, as defined in claim 1, wherein said first attachment section portion extends downwardly behind said panel.

5. An assembly, as defined in claim 1, wherein said first attachment section portion includes a panel engaging surface inclined with respect to said surface of the body section and partially spaced from said surface of the body section a distance less than the thickness of said panels so that said first portion is resiliently flexed during assembly of the anchor member with the panel.

6. An assembly, as defined in claim 5, wherein said shoulder means on said second attachment section portion initially flare away from said body section surface, said second attachment section portion including a lower cam surface engageable with the support member when the anchor member is secured to the support member for flexing said second attachment section portion upwardly and urging said shoulder means into engagement with the panel.

7. A one-piece resilient plastic anchor member adapted to be applied to an apertured workpiece comprising a body section for overlying one side of the workpiece, and an attachment section extending from the body section in a predetermined direction for assembly around edges of an apertured workpiece for connecting the anchor member to the workpiece, said body sections including bore means therein extending through one end thereof and transversely with respect to said predetermined direction for receiving and threadedly engaging a complementary element such as a screw and the like and supporting said element generally parallel to the workpiece when the anchor member is applied to the workpiece, said attachment section including a first portion insertable through the workpiece aperture and presenting shoulder means engageable behind an edge of the workpiece aperture, and said attachment section including resilient finger means extending in said predetermined direction from junctions with said body section and having shoulder means thereon projecting toward and spaced from said first portion for snapping behind a second edge of the workpiece and cooperating with said first portion in retaining the anchor member in assembled relationship with the workpiece.

8. An anchor member, as defined in claim 7, wherein said first attachment section portion extends from an integral junction with one margin of said body section and said finger means includes a pair of resilient finger elements extending from integral junctions with an opposite margin of said body section.

9. An anchor member, as defined in claim 8, wherein groove means are provided traversing said junctions between said finger elements and said body section for facilitating flexing of the finger elements during application of the anchor member to the workpiece.

10. An anchor member, as defined in claim 7, wherein said bore means is in said first portion of said attachment section.

11. A one-piece resilient plastic anchor member comprising a body section having one side adapted to overlie a side of a workpiece having an aperture therethrough and an edge spaced a predetermined distance from the aperture, and an attachment section extending generally laterally in a predetermined direction from said one side of the body section for connecting the anchor member to said workpiece, said attachment section including a first laterally extending portion insertable through the workpiece aperture, said first portion comprising shoulder surface means at a free terminal end thereof extending transversely of said predetermined direction for engaging behind the workpiece when said first portion is inserted through the workpiece aperture, said attachment section including a resilient finger element offset from said first portion a distance similar to said predetermined distance, second shoulder surface means on said finger element extending toward said first portion and adapted to be snapped around said edge of the workpiece for engaging behind the workpiece when the anchor member is applied to the workpiece, and said body section including bore means extending generally parallel to said one side thereof for receiving and threadedly engaging a complementary element such as a screw and the like and supporting said element generally parallel to the workpiece when the anchor member is applied to the workpiece.

12. An anchor member, as defined in claim 11, wherein said finger element includes outwardly projecting cam portions generally oppositely from its shoulder surface means and adapted to be engaged for biasing the finger element so as to urge its shoulder means surface against the workpiece.

13. An anchor member, as defined in claim 11, wherein said shoulder surface means of said first portion is reversely inclined with respect to said predetermined direction and is at least partially spaced from said one side of the body section in said predetermined direction a distance less than a predetermined thickness of the workpiece for causing flexing of said first portion when the anchor member is applied to the workpiece for enabling the inherent resiliency of the anchor member material to urge said one side of the body section firmly against the workpiece.

14. An anchor member, as defined in claim 11, wherein said first portion and said finger element include oppositely facing surface sections immediately adjacent said body section and spaced apart a distance substantially corresponding to the spacing of said workpiece edge from the workpiece aperture for engaging a margin of the workpiece aperture and said edge and resisting shifting movement of the anchor member in a direction extending transversely of said predetermined direction.

15. An anchor member, as defined in claim 11 which includes groove means in and extending generally diagonally of said finger element and traversing an integral junction of said finger element with said body section for promoting flexing of the finger element and reducing any possibility of breakage of the finger element during assembly of the anchor member with a workpiece.

16. An anchor member, as defined in claim 11, wherein said body section includes an enlarged end portion providing a flange projecting laterally from the remainder of the body section, and said anchor member includes a pair of said finger elements extending from integral junctions with opposite ends of said flange.

17. An anchor member, as defined in claim 11 wherein said bore means extends through an end of said body section adjacent said finger element and terminates short of an opposite end of the body section for enabling the anchor member to insulate a screw or the like applied to the bore means from the workpiece.

18. A one-piece resilient electrically insulating plastic anchor and support member adapted to be applied to a workpiece such as an electronic chassis having a generally planar upstanding wall section presenting a downwardly facing marginal edge and an aperture through said upstanding wall section spaced a predetermined distance above said edge, comprising a thick upstanding body section having first side surface means for overlying and abutting one side of said wall section, elongated bore means extending in said body section generally parallel to said surface means, said bore means having a smooth wall and opening at a bottom end of said body section for receiving a screw adapted to form complementary threads in said wall for securing said body section against a support member, first and second resiliently flexible finger elements extending from integral junctions with said bottom end of said body section, said finger elements being located at opposite sides of said bore means and projecting laterally of said first side surface means for engaging beneath said edge of the workpiece wall section, each of said finger elements including an upwardly extending shoulder adjacent a free end thereof adapted to be snapped past said edge for engaging behind said wall section and holding the wall section towards said first side surface means, and a third element integral with said body section and projecting laterally of said first side surface means at a location spaced upwardly substantially said predetermined distance from said finger elements for extending through said aperture in said wall section, shoulder means on said third element engageable behind said wall section for retaining said wall section towards said surface means, and an abutment surface on said third element spaced above said shoulders on said finger elements a distance less than said predetermined distance and engageable with an edge of said aperture for cooperating with said finger elements and preventing relative vertical movement between said body section and said workpiece wall section.

References Cited in the file of this patent

UNITED STATES PATENTS

| | | |
|---|---|---|
| 2,753,141 | Weber | July 3, 1956 |
| 2,873,496 | Elms | Feb. 17, 1959 |
| 2,941,235 | Schwartz | June 21, 1960 |